(12) United States Patent
Brocard et al.

(10) Patent No.: US 6,367,768 B1
(45) Date of Patent: Apr. 9, 2002

(54) DIRECT CONTROL FUEL VALVE FOR FUEL FLOW INJECTING CIRCUIT

(75) Inventors: Jean-Marie Brocard, Rubelles; Guy D'Agostino, Vitry sur Seine; Bertrand Esquevin, Blandy les Tours; Christian Leboeuf, Brunoy; Philippe Prades, Vaux le Penil, all of (FR)

(73) Assignee: Societe Nationale d'Etude et de Construction de Moteurs d'Aviation "SNECMA", Paris (FR)

( * ) Notice: Subject to any disclaimer, the term of this patent is extended or adjusted under 35 U.S.C. 154(b) by 0 days.

(21) Appl. No.: 09/582,226
(22) PCT Filed: Nov. 23, 1999
(86) PCT No.: PCT/FR99/02881
§ 371 Date: Jul. 21, 2000
§ 102(e) Date: Jul. 21, 2000
(87) PCT Pub. No.: WO00/31449
PCT Pub. Date: Jun. 2, 2000

(30) Foreign Application Priority Data

Nov. 24, 1998 (FR) .............................................. 98 14805

(51) Int. Cl.[7] .............................................. F16K 31/04
(52) U.S. Cl. .................. 251/129.12; 251/310; 137/554
(58) Field of Search ....................... 251/129.12, 129.11, 251/129.13, 310; 137/554

(56) References Cited

U.S. PATENT DOCUMENTS

| | | | | |
|---|---|---|---|---|
| 2,516,388 A | * | 7/1950 | Humphreys | 251/310 X |
| 3,273,595 A | * | 9/1966 | Novak | 251/310 X |
| 4,250,921 A | * | 2/1981 | Pingel et al. | 137/590 X |
| 4,621,789 A | * | 11/1986 | Fukamachi | 251/129.12 |
| 4,809,949 A | * | 3/1989 | Rakieski | 251/310 |
| 5,164,643 A | * | 11/1992 | Campau | 318/265 |
| 5,356,112 A | * | 10/1994 | Simar et al. | 251/129.12 X |
| 5,588,637 A | * | 12/1996 | Carsten et al. | 251/129.03 |
| 6,186,471 B1 | * | 2/2001 | Genga et al. | 251/129.12 |

FOREIGN PATENT DOCUMENTS

FR       2 747 174       10/1997

* cited by examiner

Primary Examiner—John Kwon
Assistant Examiner—John Bastianelli
(74) Attorney, Agent, or Firm—Oblon, Spivak, McClelland, Maier & Neustadt, P.C.

(57) ABSTRACT

A fuel valve for a fuel flow injection circuit, operating on electrical energy rather than hydraulic energy. The fuel valve has a valve body, a first fuel inlet opening, and a distribution assembly having a plug rotating in a bushing, the plug and bushing each having an opening slit. The valve body includes a fuel outlet opening section made by an overlapping area between the opening in the bushing and the opening in the plug. A plug position unit is provided to control a position of the plug in rotation, and the plug position unit is disposed in the valve body. The valve body further contains an electric motor that drives a rotation of a reduction gear assembly, the reduction gear assembly comprising an input shaft and an output pinion. The plug comprises a toothed sector engaging on the splines of the reduction gear assembly output pinion such that rotating the electric motor causes a rotation of the plug.

19 Claims, 4 Drawing Sheets

DIRECT CONTROL FUEL VALVE FOR FUEL FLOW INJECTING CIRCUIT

DESCRIPTION

1. Field of the Invention

The invention is related to fuel valves for a fuel flow injection circuit into a turbojet, or more generally into an aircraft engine. The valve is intended to be inserted in a servocontrol loop controlling the fuel flow directed towards the injectors of an aircraft engine.

2. Prior Art

Fuel valves are well known in the state of the art, and enable to adjust the section of the fuel passage and consequently to adjust the flow towards the engines. For example, this type of valve is known in patent FR 2 747 174 deposited by the SAMM (Société d'Application des Machines Motrices—Driving Machines Application Company) for a hydraulic distributor for aircraft servocontrol. A distributor of the valve type described in this patent comprises a plug mounted free to rotate inside a fixed bushing housed in a body in which an annular element is inserted between the plug and the bushing. The plug comprises an opening which more or less coincides with an opening in the bushing in which the plug is free to rotate. Rotating the plug controls the section of the fuel passage and therefore the fuel flow. In valves controlled by an electrohydraulically servocontrolled delivery pump, the plug is rotated by a hydraulic regulation system in which the regulation fluid is composed of pressurized fuel.

The advantages of this type of fuel valve are well known, and particularly there is no longer any need to demonstrate its reliability considering the number of years during which it has been in use. However, there are disadvantages of valves regulated by a fuel powered electrohydraulically servocontrolled delivery pump, particularly because more fuel is necessary at the pump to supply regulation control devices, particularly due to the fact that regulation control devices must operate when the flow is at its lowest level. This oversizing of the pump and the weight of the fuel and regulation devices are expensive in terms of weight.

These devices may become seized if the fuel is polluted, which increases the risk of failures. To avoid the risk of the fuel freezing in regulation devices when the aircraft is at a high altitude, the fuel must be heated before it is allowed to enter the regulation devices. If the pump is oversized to maintain a satisfactory flow for regulation devices, the heat exchanger heating the fuel must be sized accordingly which increases the weight. The valve cannot be tested unless the valve is pressurized, which means that the aircraft engines are started up. Finally, when the valve is replaced, special care is necessary in the workshop to prevent foreign bodies from entering the valve, which in practice means that the valve cannot be quickly replaced on line.

Patent application FR 72 32411 deposited on Sep. 13, 1972 with a priority claim over application U.S. Pat. No. 208,249 on Dec. 15, 1971 describes a valve with a spherical closer 20. This closer 20 consists of a sphere in which a through cylinder is formed.

An engine 84 located outside the valve body 12 drives the closer 20 in rotation through a motor shaft 86, a reduction gear external to the body 12 and an output pinion 78. The output pinion 78 engages on a toothed sector 60 connected to the closer. The path of the liquid passing through the valve follows a trajectory along a line located in a plane perpendicular to the axis of rotation of the closer. The outside of the valve is sealed by seals 26, 28 and a Teflon add-on part 30.

It is well known that a seal cannot be made between two parts that move with respect to each other unless pressure is applied to the mobile part, which requires a greater torque on the mobile part.

BRIEF DESCRIPTION OF THE INVENTION

The valve according to the invention operates on electrical energy rather than hydraulic energy.

Consequently, there is no longer any risk of pollution of the fuel causing failures, nor is there any need for heating of the fuel which reduces the exchanger weight and globally improves the reliability of the device according to the invention. Eliminating fuel as the driver vector can reduce the weight necessary for the function performed by the valve regulation devices and therefore the weight of the turbojet is reduced. A reduction in the weight is also achieved by the smaller size of the pumping systems in the turbojet fuel circuits. As mentioned above, this size depends on the flow necessary to activate the hydraulic subassemblies when the turbojet is in operation at very low speed and therefore when the pump outputs low flows. Therefore, the lack of any flow necessary to actuate the valve according to the invention can improve the sizing of the pumping system, in terms of weight. Therefore, the overall weight of the turbojet is reduced. The valve according to the invention may also be pre-adjusted so that it outputs exactly the turbojet ignition flow, or the heating flow when the jet engine has a heating system, for example for Air Force engines, even before the fuel passes through the valve. Consequently, the performances of the turbojet in terms of capacity and ignition speed are very much improved. The valve according to the invention may be tested without the input of any hydraulic energy, which means that it can be tested without the need to turn the turbojet. Therefore, maintenance of the turbojet is very much improved. Finally, as mentioned above, the valve according to the invention can be replaced and tested without the need to start up the jet, so that the valve according to the invention becomes a line replaceable element.

In summary, a valve according to the invention has better availability in use and in service, is safer and more reliable, has lower maintenance and ownership costs, improved maintenance, improved performances, and furthermore the weight of the valve control function is lower and it is more compact.

According to the invention, the valve is controlled using an electric motor assembly and a mechanical reduction gear with a large reduction ratio, the electric motor output shaft being input to one end of the reduction gear with the output of the reduction gear controlling the position of a distributor plug through a gear system, and the said distributor. In summary, the invention relates to a fuel valve with direct electrical control comprising:

a fuel distribution assembly comprising:
- a fuel inlet opening
- a bushing comprising a first opening
- a mobile plug in the bushing comprising a second opening
- a fuel outlet with an open section that depends on the overlapping area between the first opening in the bushing and the second opening in the plug means of controlling the position of the plug in order to vary the value of the overlapping section between the first and second openings, the valve being characterized in that the means of controlling the plug position comprise the following, housed in a valve body communicating with the distribution assembly, a brushless electric motor rotating around a shaft AA', this motor driving a mechanical reduction gear assembly, this assembly comprising an input shaft and an output pinion or shaft from the reduction gear assembly, such that a motor rotation movement drives a movement of the plug and changes the overlapping areas of the first and second openings.

The fuel inlet opening is made according to a section with a fixed area and is perpendicular to the axis of rotation of the plug. Thus, the fuel inlet is parallel to the axis of rotation of the plug. The result is an opening located on a cylindrical wall of the plug centered on the axis of the plug. Therefore, the fuel output is perpendicular to the axis of the plug.

Note that an opening may be composed of several holes or slits in a wall. It is desirable that all holes in the plug that are combined to form the plug opening satisfy symmetry of revolution of the opening about an axis of rotation of the plug.

The same is true for openings in the bushing. Therefore, in general there will be at least two openings.

Although in the following example, the motor is a rotating motor and the plug is a rotating plug, there is no reason why the motor should not be a motor with axial movement driving a plug with axial or rotating movement. The motor is preferably equipped with redundant stators, for better operating safety. The motor rotor is preferably a single-piece rotor with sides parallel to the rotor axis, for example six or eight sides with a hexagonal or octagonal section. Preferably, the motor is equipped with means of determining the angular position of the rotor about its axis at any time, for example by magnets located on each side in which the flux varies a signal transmitted through one or several Hall effect sensors, for example laid out axially at the same height as the magnets.

The stator motor and the rotor housed in the valve body in communication with the distribution assembly is immersed in the hot pressurized fuel, which eliminates problems of sealing leaks between the plug and the motor.

BRIEF DESCRIPTION OF THE DRAWINGS

Other advantages and characteristics of the invention will become clear in reading the detailed description of an example embodiment of this invention with relation to the attached drawings in which.

DETAILED DESCRIPTION OF AN EMBODIMENT

Figure 1:
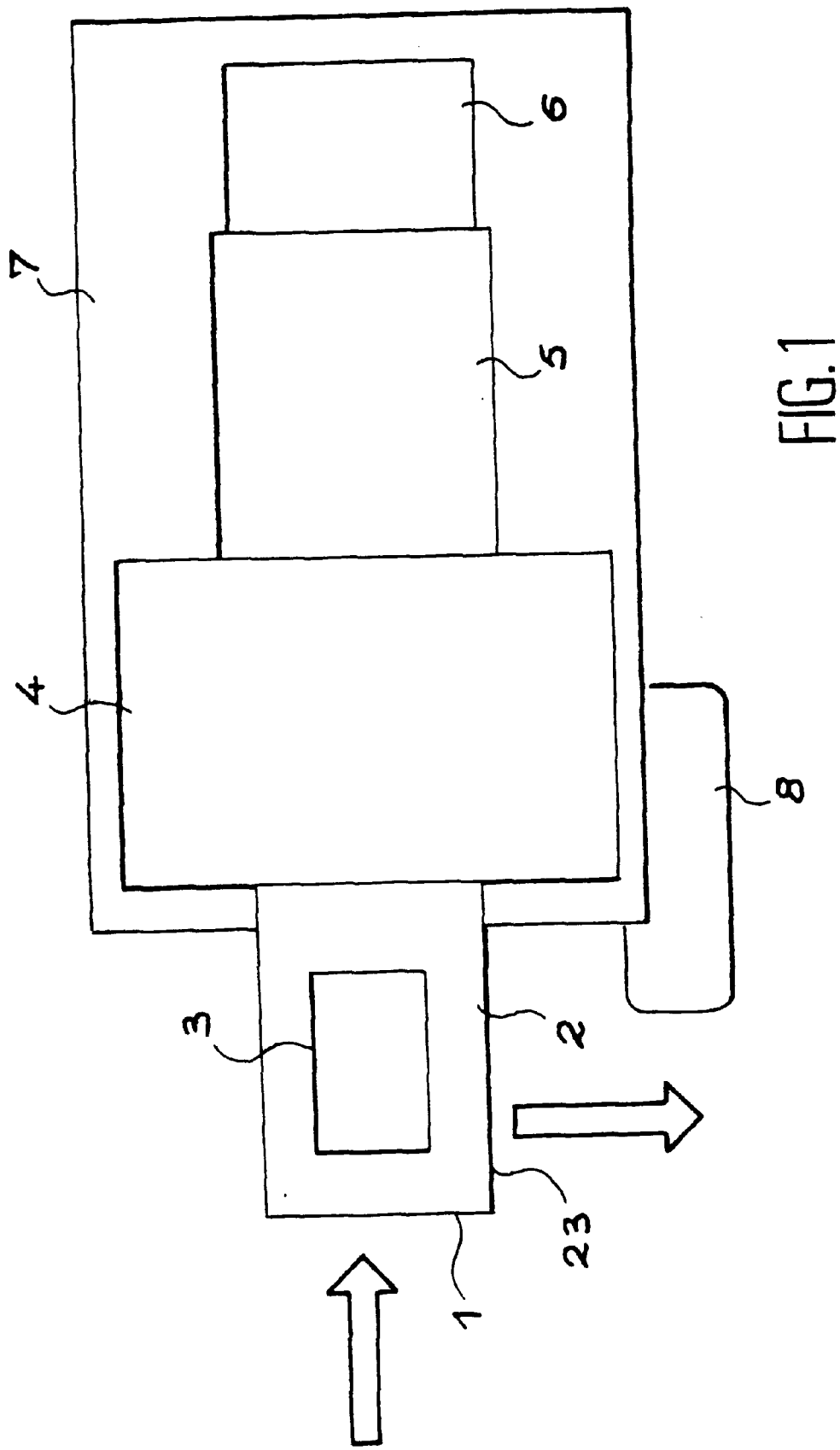
FIG. 1 shows a diagrammatic description of this invention.

In the following description, elements with the same function are marked with the same reference numbers. With reference to FIG. 1, the valve according to the invention is fitted with a fuel inlet 1, a bushing 2 inside which a plug 3 is free to rotate in which an opening is formed, not shown in FIG. 1. The plug 3 is rotated by a mechanical reduction gear with a large reduction ratio 4. This mechanical reduction gear is itself driven in rotation by a redundant electric motor assembly 5. Redundant means that the electric motor 5 is provided with a double stator, such that it would be possible to change over from one stator to the other, for example in the case of a power failure or in other types of failure. The motor 5 comprises positioning sensors 6 providing information about the position of the motor 5 and therefore the plug at all times. The motor 5 and reduction gear 4 assembly is housed inside the body 7. The body 7 is provided with means not shown in FIG. 1, firstly for fixing the bushing 2 onto the body in a sealed manner, and secondly the plug-in power supply connectors 8 for the electric motor. The plug-in connectors 8 are redundant in the sense that they are provided with connectors necessary to supply power to the first and second motor stators. They also comprise the connections necessary for a printed circuit capable of generating motor position signals that will be mentioned later. The elements shown in FIG. 1 are shown in more detail in FIG. 2 which is a longitudinal section through a valve according to the invention.

Figure 2:
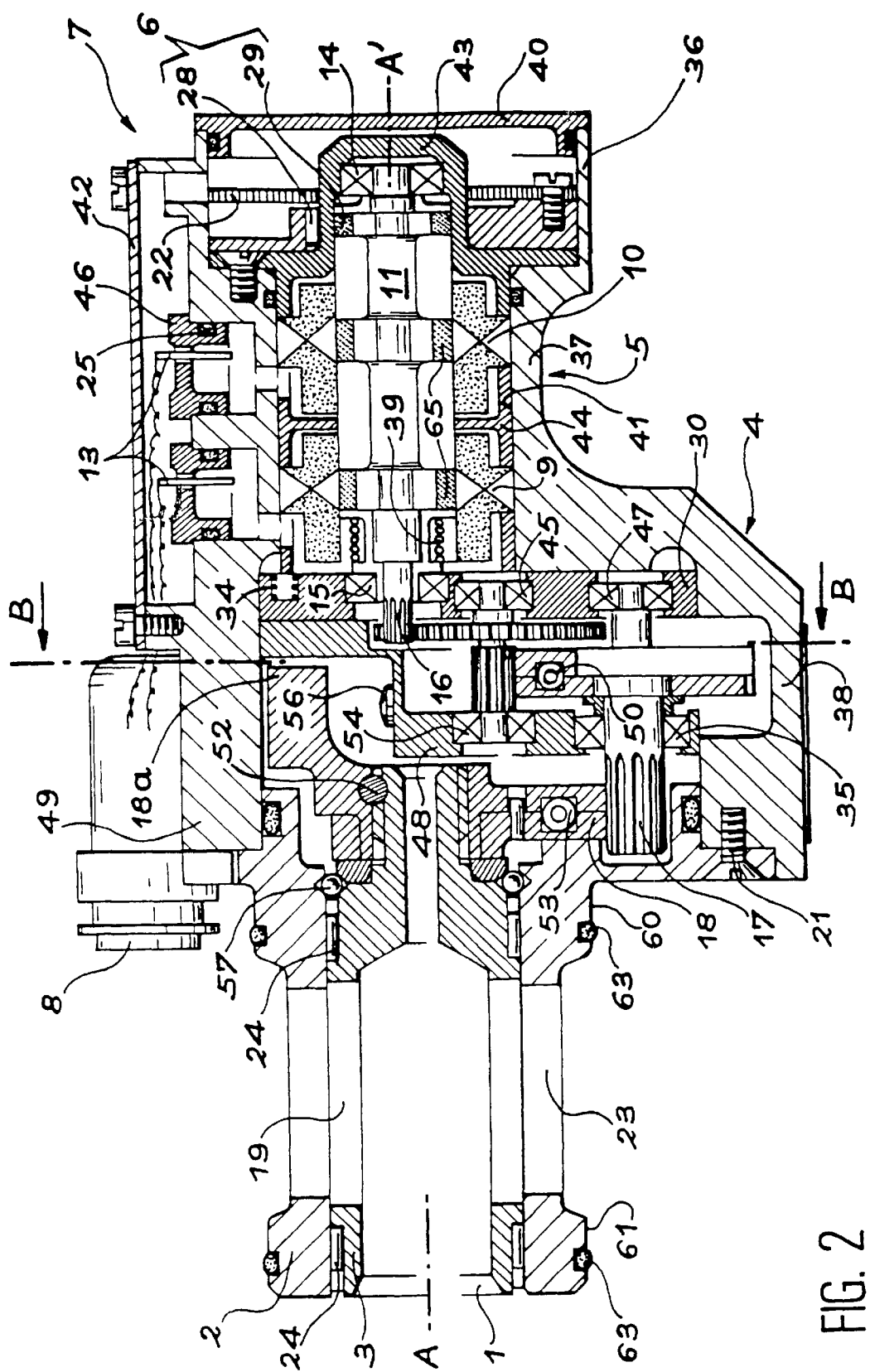
FIG. 2 shows a longitudinal section of an example embodiment of a valve like that shown in FIG. 1.

With reference to FIG. 2, the body 7 which may for example be made of a light alloy such as an aluminum alloy comprises the following components working from top to bottom in an axial direction AA' of the body 7, firstly a top end 36, an upper central part 37, a lower central part 38, and a bottom end 49. The upper central part 37 and the lower central part 38 house the motor 5 and the reduction gear 4 respectively.

The upper end 36 holds a bearing block support 43 made of a hard metal, for example titanium or a titanium alloy. Apart from its function as a bearing block support, the bearing block support 43 cooperates with an o-ring located inside the body to form a fuel seal.

The lower end 49 of the body 7 contains the bushing 2 of the distributor. The seal between the bushing 2 and the body 7 is made by an o-ring located in a plane perpendicular to the AA' axis.

The seal between the body 7 and the bushing 2 refers to a seal between the inside and outside of the valve body. However, there is no seal between the distribution assembly that comprises essentially the bushing 2 and the plug 3, and the body 7 containing the reduction motor assembly. This advantageous characteristic avoids leakage problems due to the presence of rotating seals.

As mentioned above, the motor 5 is a brushless DC motor. It comprises two redundant stators 9 and 10 mounted free to slide in a bore 41 in the upper central part 37 of the body 7. The stators 9 and 10 are positioned and separated from each other by a spacer 44. The spacer 44 is formed from an annular partition bearing on the drilling 41, which projects towards the inside of a radial partition.

This radial partition forms the separation between the stator windings 9 and 10.

The spacer 44 is held in contact axially by axial springs 34 housed at least partly in blind holes of an intermediate bearing block support 30 that will be described later. The two stators 9 and 10 are put in phase with respect to each other by pins.

The electrical crossings to bring power from connector 8 to windings of stators 9 and 10 are made through two sealed crossings 13 in the body 7 consisting of glass beads 13 poured into through holes formed in a part 46.

This part 46 is mounted in a drilling outside body 7 with an axis perpendicular to the AA' axis. The seal is made using an O-ring 25 and the part 46, preferably made of steel, is attached by screws.

The motor 5 also comprises a single-piece rotor 11. This rotor has eight flat sides forming an octagon, the flats of these sides being parallel to the AA' axis. Magnets 65 forming the blades of the rotor 11 are fixed onto each of the eight sides. These magnets are preferably glued, ground and shrink fitted. They are preferably made of a rare earth, for example samarium cobalt to reduce the weight. The rotor shaft is centered on the AA' axis of the body. The upper part of the shaft is shrink fitted in a ball bearing 14 crimped into the bearing block support 43. Switching and detection magnets 29 are also fixed on each of the eight flats of the rotor close to the upper part of the rotor. The lower part of the shaft of the rotor 11 is shrink fitted in a ball bearing 15 crimped in the intermediate bearing block support 30. The bearings 14 and 15 of the rotor shaft 11 are pressurized by means of a thrust spring 39 exerting an axial thrust on the inner rings of the bearings. This pressure reduces differential clearances and compensates for the differential clearances originating due to temperature differences.

The motor drives the plug 3 through a reduction gear assembly 4. The reduction gear 4 has pinions with straight teeth. It comprises three reduction stages, the first two of which are used for clearance compensation.

In addition to the bearing 15 at the lower end of the rotor shaft, the intermediate bearing block support 30 houses bearings 45, 47 guiding the upper ends of the pinions or shafts of the reduction gear toothed wheels. The lower ends of these pinions or toothed wheel shafts are guided by bearings 54, 35 housed in a lower bearing block support 48.

At the third stage of the reduction gear, a double pinion 17 guided by bearings 47 and 35 drives a toothed sector 18 fixed to plug 3.

The elastic elements 50, 53 designed to compensate for clearance reduce the clearance between the toothed wheels or sectors forming the second and third reduction stages, in a known manner.

The intermediate bearing block support 30 and the lower bearing support 48 are aluminum parts that are housed in recesses provided for this purpose in the lower central part 38 of the body 7. As will be described later, the support 48 also houses elastic stops limiting the travel of plug 3.

All pinion guide bearings are crimped by balls in the bearing block supports 30 and 48.

Figure 3:
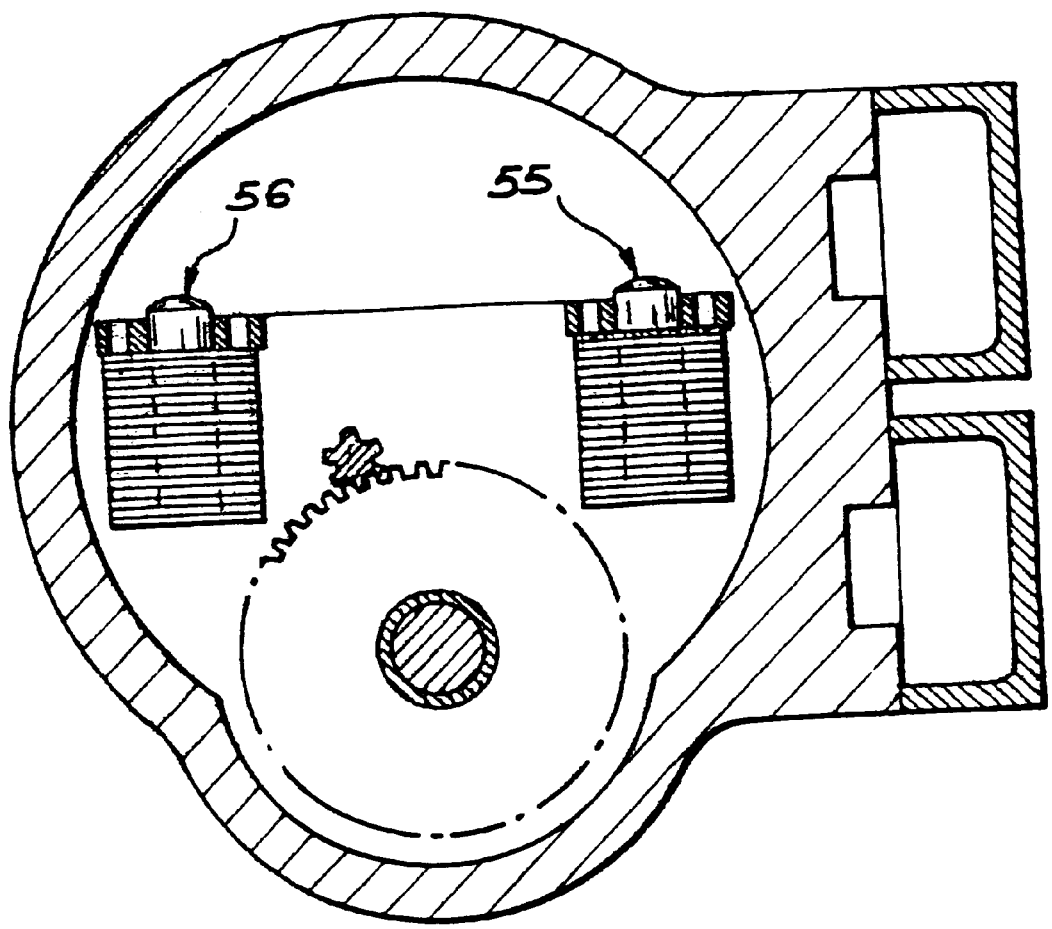
FIG. 3 shows a section along line BB in FIG. 2.

As shown in FIG. 3, a stop 52 fixed by screws on the male splines of the plug 3 delimits the angular movement of plug 3 by coming into contact on the elastic stops 55, 56 housed in the lower bearing support 48 and formed by a mobile pin, a retaining nut and elastic washers.

The hydraulic distribution assembly consisting of the bushing 2 and the plug 3 is screwed to the lower end 49 of the body 7 using screws 21. The plug 3 is preferably centered by needle bearings 24 inserted between the bushing 2 and the plug 3 It is preferably held in position axially by a ball thrust bearing 57 to reduce friction torque between the plug 3 and the bushing 2. The bushing is designed to contain a receiving cavity not shown. This reception is made by a set of two outer cylindrical bearings 60, 61 of bushing 2. These bearings carry O-rings 63. Preferably, the bearing 61 that penetrates furthest forwards into the connection cavity has a smaller diameter than the bearing 60 that is located closer to the body 7 and that is inserted last. In this way, the receiving cavity can be assembled without any risk of damaging the O-rings 63.

The fuel is delivered by two exponentially shaped slits 23 placed on the bushing 2 symmetrically about the axis AA' of the plug. The plug 3 has two triangular slits 19. The section of the fuel passage is a function of the overlapping area of slits 19 and 23.

Figure 4:
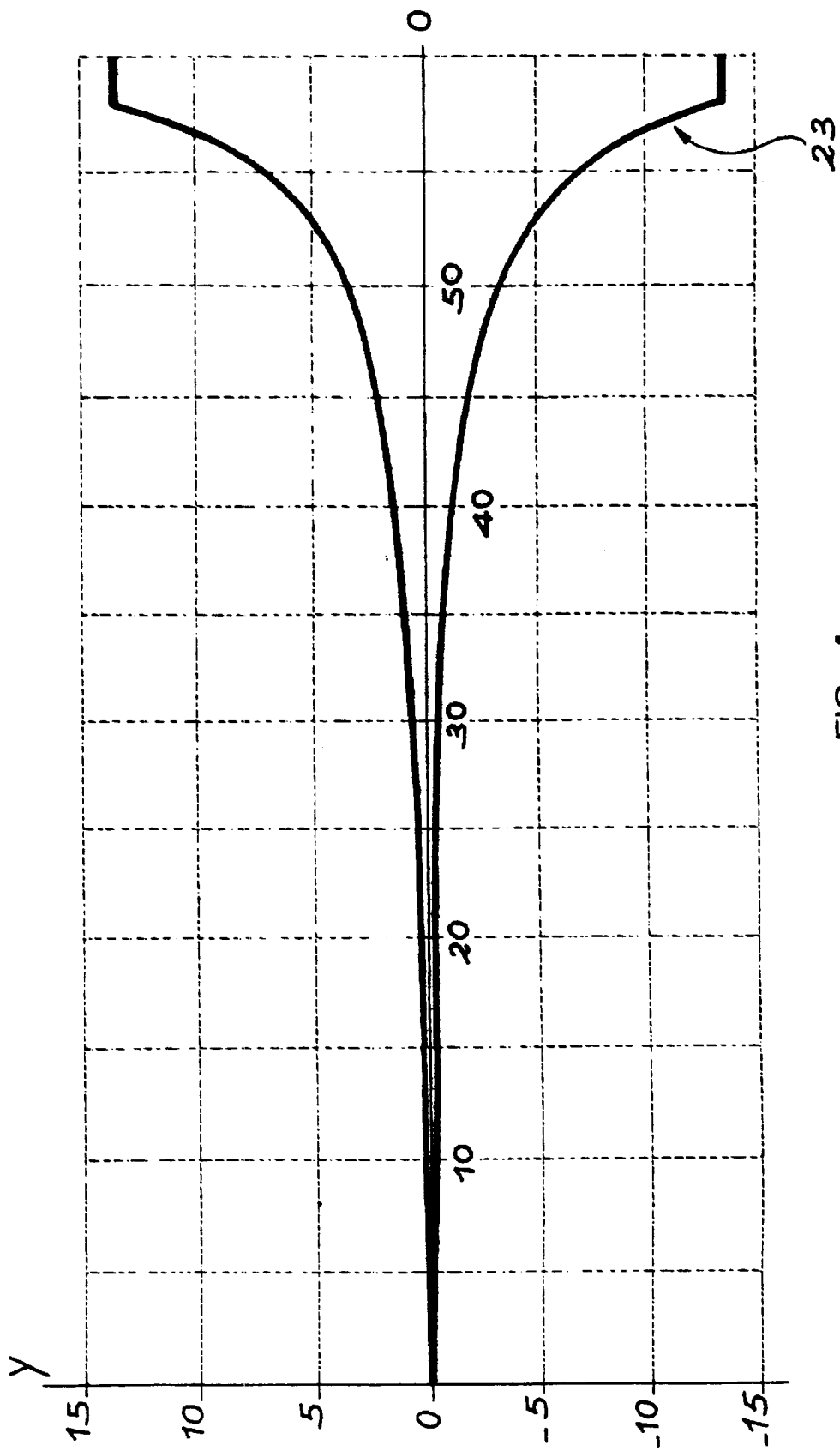
FIG. 4 shows an embodiment of an opening in the bushing.

The shape of an exponential slit 23 in bushing 2 is shown in FIG. 4. It is shown in the form of a graph in which the abscissa represents the values of the angle of rotation about the axis of the plug 3 and the ordinate Y represents the values of the length of the slit measured from a plan of symmetry of the slit 23 perpendicular to the AA' axis. The advantage of having an exponentially shaped opening 23 is that the relative flow error due to the positioning error can be kept constant.

Preferably, the slit is made by electro-erosion and the bushing 2 and the plug 3 are made of stainless steel bearing steel.

The slit is said to be exponential because the distance between a reference plane perpendicular to the center-line of the plug, which, in the example shown, is the plane of symmetry of the slit, and the edge of the slit increases exponentially with the value of the angular sector of the opening over most of the angular sector. In the example shown in FIG. 4, the opening 23 is exponential between 0 and 58° and is then rectangular between 58 and 60°.

Hall effect sensors 28 located in an axial direction at the same level as the switching and detection magnets 29 emit a signal that varies with the relative position of the magnet 29 closest to the sensor. A set of three sensors 28 associated with the eight magnets 29 located on each of the eight faces of the rotor 11 determines twenty-four motor positions. The position of the motor is thus known to within $$\frac{360°}{24°} = 15°.$$

If the reduction ratio of the motor and the plug, N, is known, the position of the plug is known to within $$\frac{15°}{N}.$$

For example if N is between 500 and 1000, the position of the plug is known with a precision of between 0.015 and 0.03°. The absolute positioning precision of the plug is thus constant and depends only on the number of positions of the motor that can be found, and the reduction ratio that is constant. Under these conditions in which the absolute value of the plug positioning error is constant, the exponential shape of the opening means that the relative error on the fuel flow can be kept constant. The sensors 28 are placed outside the part of the body 7 that contains fuel. They are protected by the rear bearing support 43. They are installed on a sensors printed circuit 22.

A cover 40 encloses an upper compartment of the body 7 housing the upper bearing support 43 and circuits 22 supporting the Hall effect sensors 28. Another cover 42 fixed to the outside of the body 7 at the upper parts 36 and the upper central part 37 contains electrical connections between the plugs 8 and circuit pins 22 and stator windings 9 and 10.

The operation of the device according to the invention will now be commented upon.

The position of the motor 5 determines the position of the plug 3 through the reduction gear 4. As described above, knowledge of the position of the motor within 15° enables a precision of the position of the plug to about one hundredth of a degree, due to the large reduction gear ratio. Due to this reduction gear and the systematic use of a ball thrust bearing, friction is low and power necessary to energize the valve is less than 5 watts.

The position information for the rotor of motor 5 is known from magnets 29 and sensors 28, and is sufficient to control switching of windings of the stator 9 or 10 that is in service. Thus, the same sensors can be used to perform the stator winding switching function and to determine the plug position. Consequently, these sensors are coupled to means not shown for switching the windings of the stator 9 and 10 in service, and means also not shown for detecting the position of the plug 3 used in the fuel flow regulation loop.

If the motor electricity power supply is interrupted, the plug remains in the position that it was in at the time of the cutoff. This is due to the fact that the torque induced by reaction forces due to the delivered fuel flow is less than the sum of the following resistance torques dry friction torque of the reduction gear motor, torques due to the elastic clearance compensation means 50, 53 of the reduction gear, torque due to iron losses due to motor hysteresis.

This facility of holding the position of the plug unchanged if control is lost is very important since loss of control does not cause any discontinuity in the engine feed.

Another safety aspect is due to the high motor torque available at the plug. Although the motor torque is low (of the order of a few millinewton.meters), a torque of 15 to 20 decanewton.meters is available at the plug due to the large reduction ratio. This torque is sufficient to shear any metallic filings that might be introduced between the bushing and the plug. Thus, any metallic filings will not prevent operation of the valve.

Finally, since the motor is brushless, all problems due to contact between brushes and a collector located on the rotor are avoided. This thus increases the operating safety and reliability of the valve.

What is claimed is:

1. A fuel valve with direct control, comprising:
   a fuel distribution assembly comprising,
   a fuel inlet opening,
   a bushing having a first opening,
   a plug rotating in the bushing about an axis of rotation of the plug, having a second opening, and
   a fuel outlet with an opening section that depends on an overlapping area between the first opening in the bushing and the second opening in the plug;
   a plug position unit controlling a position of the plug in order to vary a value of an overlapping section between the first and second openings;
   a valve body comprising,
   a brushless electric motor rotating around the axis of rotation of the plug,
   a mechanical reduction gear assembly driven by the electric motor,
   an input shaft, and
   an output pinion, wherein
   the input shaft and the output pinion are connected to the reduction gear assembly, such that a rotation movement of the electric motor drives a rotation movement of the plug and changes the overlapping area of the first and second openings, and
   the fuel inlet opening comprises a fixed section, perpendicular to the axis of rotation of the plug.

2. The fuel valve according to claim 1, wherein the electric motor comprises two switchable redundant stators.

3. The fuel valve according to claim 1, wherein the electric motor comprises a single-piece rotor with flat sides laid out along an axial direction of the single-piece rotor.

4. The fuel valve according to claim 1, wherein the electrical motor comprises an angular position unit configured to detect an angular position of the electrical motor.

5. The fuel valve according to claim 4, wherein the angular position unit comprises:
   magnets placed on each of the flat sides of the single-piece rotor; and
   Hall effect sensors.

6. The fuel valve according to claim 1, wherein the valve body further comprises:
   a top end;
   an upper central part;
   a lower central part; and
   a lower end, wherein the top end comprises an upper bearing block support enclosing the upper central part containing the electrical motor, and the lower central part is housing the reduction gear assembly and the lower end into which the fuel distribution assembly fits in a sealed manner.

7. The fuel valve according to claim 6, wherein the upper bearing block support comprises a first bearing that guides an upper end of a shaft of the single-piece rotor of the electric motor, a lower end of the shaft of the single-piece rotor fitting into a second bearing disposed in an intermediate bearing block support housed in the lower central part of the valve body.

8. The fuel valve according to claim 7, wherein the valve body further comprises a thrust spring configured to apply axial thrust on the first and second bearings of the upper and lower ends of the shaft of the single-piece rotor of the electric motor.

9. The fuel valve according to claim 7, wherein the intermediate bearing block support comprises a set of bearings that guide an upper end of the output pinion and a plurality of pinions of the reduction gear assembly, a lower end of the output pinion and the plurality of pinions being guided in a plurality of bearings disposed in a lower bearing block support.

10. The fuel valve according to claim 1, wherein the reduction gear assembly comprises clearance reduction elements.

11. The fuel valve according to claim 1, wherein the plug is installed in the bushing on a set of bearings located between the bushing and the plug.

12. The fuel valve according to claim 1, further comprising a first and second cylindrical bearings are disposed outside of the bushing, a first cylindrical bearing being close to the valve body and a second cylindrical bearing being further from the valve body, the second cylindrical bearing having a smaller diameter than the first cylindrical bearing.

13. The fuel valve according to claim 1, further comprising a ball thrust bearing that holds the plug in contact with the bushing in the axial direction of the single-piece rotor.

14. The fuel valve according to claim 9, wherein the plug comprises a thrust bearing configured to prevent a contact of the plug with a plurality of stops housed in the lower bearing block support.

15. The fuel valve according to claim 1, wherein a first torque of the electric motor, having a few millinewton.meters, produces a second torque of 15 to 20 decanewton.meters through the reduction gear assembly.

16. The fuel valve according to claim 4, wherein the angular position unit is coupled to a switching unit that switches the switchable redundant stators of the electric motor, and to the plug position unit.

17. The fuel valve according to claim 1, wherein the first opening of the plug is composed of slits cutout in an outside wall of the plug, the first opening having a symmetry of revolution about the axis of rotation of the plug.

18. The fuel valve according to claim 17, wherein each slit of the first opening has an edge for which a distance between the edge and a reference plan perpendicular to the axis of rotation of the plug is increasing exponentially with respect to a value of the angular rotation of the plug around the axis of rotation of the plug.

19. The fuel valve according to claim 16, further comprising plug-in electrical connectors.

* * * * *